United States Patent [19]

Molter

[11] Patent Number: 5,141,620
[45] Date of Patent: Aug. 25, 1992

[54] DEVICE AND METHOD FOR SEPARATING AND COMPRESSING CARBON DIOXIDE FROM A CARBONATE SALT

[75] Inventor: Trent M. Molter, Enfield, Conn.

[73] Assignee: United Technologies Corporation, Hartford, Conn.

[21] Appl. No.: 629,319

[22] Filed: Dec. 18, 1990

[51] Int. Cl.$^5$ .............................................. C25B 9/00
[52] U.S. Cl. .................................. 204/232; 204/263; 204/265
[58] Field of Search ...................... 204/129, 103, 182.4, 204/182.5, 98, 252, 263, 232; 423/230, 223; 429/46, 51

[56] References Cited

U.S. PATENT DOCUMENTS

| | | | |
|---|---|---|---|
| 3,401,100 | 9/1968 | Macklin | 204/103 |
| 3,494,842 | 2/1970 | De Respiris | 204/129 |
| 3,519,488 | 7/1970 | Giner | 204/103 |
| 3,847,672 | 11/1974 | Trocciola et al. | 136/86 |
| 3,865,924 | 2/1975 | Gidaspow et al. | 423/230 |
| 4,117,079 | 9/1978 | Bellows | 423/223 |
| 4,311,771 | 1/1982 | Walther | 429/51 |
| 4,370,209 | 1/1983 | Graybill et al. | 204/98 |
| 4,391,680 | 7/1983 | Mani et al. | 204/98 |
| 4,536,269 | 8/1985 | Chlanda et al. | 204/182.4 |
| 4,608,141 | 8/1986 | Chlanda et al. | 204/182.5 |
| 4,666,574 | 5/1987 | Oda et al. | 204/98 |

OTHER PUBLICATIONS

Aquatech TM Systems' Pickle Liquor Recovery Process First Year of Operation at Washington Steel; J. McArdle, J. Piccari, G. Thornburg; 1989.
Chemical Processing; Allied Signaling; Copyright 1985.
Advanced EMU Electrochemical $CO_2$ Remover Module Breadboard; Life Systems Inc.; Nov. 30, 1985; p. 5, Data Items 402-4A, 402-22A, 402-11B..
Physical/Chemical Closed-Loop Life Support and Extra Vehicular Activity/Suit Technology; Oct. 25-26, 1989; FIGS. 5-8-4-1 to 5-8-4-3, 5-8-4-9, 5-8-6-1 to 5-8-6-4 and 5-8-6-10.

Primary Examiner—John Niebling
Assistant Examiner—Mark Bender
Attorney, Agent, or Firm—George J. Romanik

[57] ABSTRACT

A device for separating and compressing carbon dioxide from a carbonate salt comprises an anion membrane and a cation membrane. The anion and cation membranes define a fluid feed compartment. The anion membrane has an anode disposed on it. The cation membrane has a cathode disposed on it. An enclosed carbon dioxide collection compartment, in which carbon dioxide pressure can be regulated, is located adjacent to the anode. The device also has an enclosed scrubbing fluid collection compartment adjacent to the cathode and means for inducing an electrical potential across the anode and cathode. The device is capable of supplying carbon dioxide at high pressures when a carbonate salt is fed to the fluid feed compartment and an electrical potential is induced across the anode and cathode.

8 Claims, 2 Drawing Sheets

DEVICE AND METHOD FOR SEPARATING AND COMPRESSING CARBON DIOXIDE FROM A CARBONATE SALT

DESCRIPTION

1. Technical Field

The present invention relates to a device for the the removal and compression of carbon dioxide from gas streams. In particular, it relates to electrochemical devices for removal and compression of carbon dioxide from gas streams 2. Background Art Management of carbon dioxide gas levels within closed environments characteristic of spacecraft or undersea vehicles is necessary to support long term human habitation. Carbon dioxide must be continuously removed from the air and concentrated for storage or subsequent processing.

Carbon dioxide is often removed from air and other gas streams by a scrubbing process which uses a metal hydroxide scrubbing fluid. The metal hydroxides commonly used as scrubbing fluids include sodium hydroxide, lithium hydroxide, potassium hydroxide, or cesium hydroxide. The end product of the scrubbing process is typically a carbonate salt solution such as sodium carbonate, lithium carbonate, potassium carbonate, or cesium carbonate. The carbonate salts can be separated into carbon dioxide and the original metal hydroxide in order to concentrate the carbon dioxide and to regenerate the scrubbing fluid.

Electrochemical devices which will separate carbon dioxide from carbonate salts and regenerate metal hydroxide scrubbing fluids for further use are known. U.S. Pat. No. 3,519,488 to Giner discloses a carbon dioxide absorber means and a fuel cell to regenerate a metal hydroxide scrubbing fluid. According to this patent, a gas stream, such as air, containing carbon dioxide is contacted with a potassium hydroxide scrubbing fluid to produce a potassium carbonate solution. The potassium carbonate solution is fed to a liquid electrolyte fuel cell where carbon dioxide gas is evolved from a liquid solution and the potassium hydroxide scrubbing fluid is regenerated. The carbon dioxide gas may be collected at or near atmospheric conditions. Other similar devices are known and are available commercially. Like the device disclosed in U.S. Pat. No. 3,519,488, they produce carbon dioxide at atmospheric conditions.

Sometimes it is desirable to process the carbon dioxide produced by a regeneration cell in a carbon dioxide reduction cell which generates oxygen or liquid organic compounds. Electrolysis cells which produce such products are known in the art. Typically, carbon dioxide must be fed to such cells at an elevated pressure For example, pressures of about 500 psig to about 1000 psig are desirable.

If carbon dioxide from a regeneration cell such as that disclosed in U.S. Pat. No. 3,519,488 is fed to a carbon dioxide reduction cell or other downstream processing unit, the carbon dioxide must be compressed to a higher pressure. This requires an auxiliary compressor and the associated driver means because the regeneration cells produce carbon dioxide at atmospheric pressures. Given the severe space and weight limitations imposed by closed systems such as spacecraft or undersea vehicles, the need for an auxiliary carbon dioxide compressor can make it impractical to consider downstream carbon dioxide processing. Alternately, including an auxiliary carbon dioxide compressor on such a craft could displace other desirable devices.

Accordingly, what is needed in the art is a device which can regenerate a metal hydroxide scrubbing fluid while both separating and compressing carbon dioxide for further processing. Such a device would eliminate the need for an auxiliary carbon dioxide compressor.

DISCLOSURE OF THE INVENTION

The present invention is directed towards a device which can regenerate a metal hydroxide scrubbing fluid while both separating and compressing carbon dioxide for further processing.

One aspect of the invention includes a device for separating and compressing carbon dioxide from a carbonate salt. The device has an anion membrane with an inner face and an outer face and a cation membrane with an inner face and an outer face. The inner faces of the anion and cation membranes define a fluid feed compartment. A catalyst capable of ionizing hydrogen is disposed on the outer face of the anion membrane to form an anode. A catalyst capable of ionizing water to hydroxyl ions is disposed on the outer face of the cation membrane to form a cathode. An enclosed carbon dioxide collection compartment is located adjacent to the anode. The carbon dioxide collection compartment has means for regulating carbon dioxide pressure and for supplying hydrogen to the anode. An enclosed scrubbing fluid collection compartment is located adjacent to the cathode. The scrubbing fluid collection compartment has means for supplying water to the cathode and for withdrawing regenerated metal hydroxide scrubbing fluid. Means are also provided for inducing an electrical potential across the anode and cathode. The device is capable of separating a carbonate salt fed to the fluid feed compartment into compressed carbon dioxide and regenerated metal hydroxide scrubbing fluid.

Another aspect of the invention includes a method for separating and compressing carbon dioxide from a carbonate salt. A carbonate salt solution is introduced into the fluid feed compartment of a carbonate salt separator/compressor as described above. Hydrogen is supplied to the anode and water is supplied to the cathode. An electrical potential is induced between the anode and cathode such that the hydrogen and water are ionized to hydrogen and hydroxyl ions, respectively, and the salt in the feed compartment decomposes into carbonate anions and metal cations. The carbonate anions are transported across the anion membrane where they react with hydrogen ions to form carbon dioxide and water. The metal cations are transported across the cation membrane where they react with hydroxyl ions to form metal hydroxide and hydrogen. The flow of carbon dioxide from the carbon dioxide collection compartment is regulated to supply carbon dioxide at high pressures.

Another aspect of the invention includes a method for removing and compressing carbon dioxide from a gas. A gas containing carbon dioxide is introduced into the scrubbing fluid collection compartment of a carbonate salt separator/compressor as described above so that the carbon dioxide reacts with a metal hydroxide scrubbing fluid to form a metal carbonate. The gas and the metal carbonate are removed from the scrubbing fluid collection compartment and the gas is separated from the metal carbonate. The metal carbonate is fed to the fluid feed compartment of the separator/compressor, hydrogen is supplied to the anode, and water is supplied to the cathode. An electrical potential is induced between the anode and cathode such that the hydrogen and water ionize and the metal carbonate in the fluid feed compartment decomposes into carbonate anions and metal cations. The carbonate anions are transported across the anion membrane where they react with hydrogen ions to form carbon dioxide and water. The metal cations are transported across the cation membrane where they react with hydroxyl ions to form metal hydroxide and hydrogen. The flow of carbon dioxide from the carbon dioxide collection compartment is regulated to supply carbon dioxide at high pressures.

The foregoing and other features and advantages of the present invention will become more apparent from the following description and accompanying drawings.

BEST MODE FOR CARRYING OUT THE INVENTION

The present invention is an electrochemical cell which is capable of separating a carbonate salt into carbon dioxide and a regenerated metal hydroxide scrubbing fluid. The construction of the cell makes it possible to compress the carbon dioxide produced to pressures up to about 1000 psig. The device will be referred to as a separator/compressor.

Figure 1:
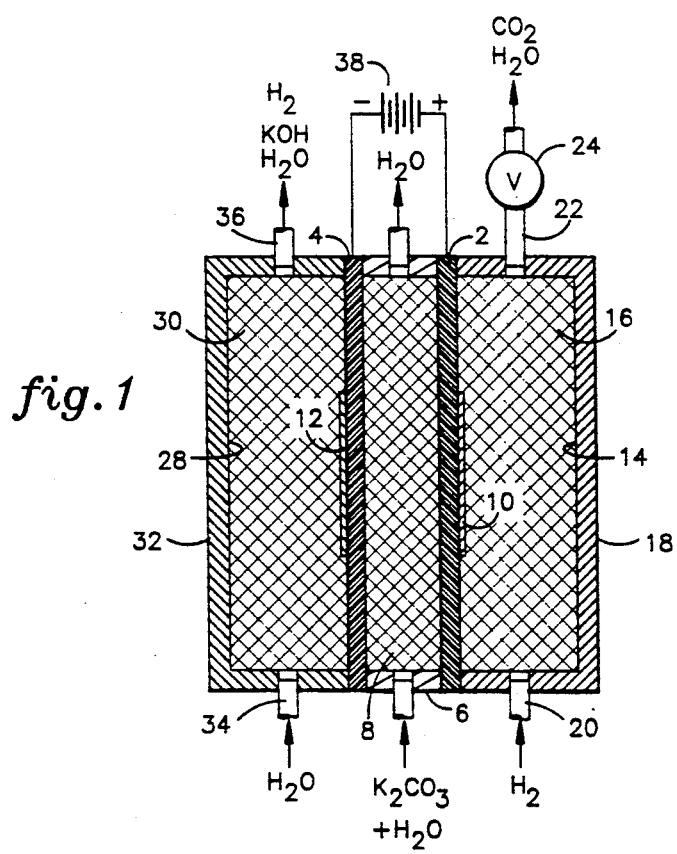
FIG. 1 depicts a separator/compressor of the present invention.

As shown in FIG. 1, the separator/compressor has an anion membrane 2 with an inner face and an outer face and a cation membrane 4 with an inner face and an outer face. The inner faces of the anion and cation membranes define a fluid feed compartment 6, into which the carbonate salt solution is fed. The fluid feed compartment may be filled with a spacer 8 which supports the membranes and maintains the shape of the feed compartment. The spacer must be porous to permit the carbonate salt solution to flow freely through the feed compartment. The spacer may be made from any material chemically inert to the carbonate salt solution in the feed compartment. The spacer may be electrically conductive, although this is not a requirement. For example, the spacer may be a screen package made from niobium metal. Other suitable chemically inert materials include teflon, ceramics, and metals such as tantalum, titanium, and zirconium. Those skilled in the art will understand that this is but one of many suitable embodiments for the spacer.

The anion membrane 2 and a cation membrane 4 are semi-permeable membranes which function as solid polymer electrolytes. The anion membrane is selectively permeable to carbonate anions. It may be formed from any material which will permit carbonate anions to diffuse through, while excluding metal cations. For example, the anion membrane may be made from a polyolefin, tetrafluoroethylene (TFE), fluorinated ethylenepropylene/TFE (FEP/TFE), polystyrene divinylbenzene (PS-DVB) on nylon, PS-DVB on polytetrafluoroethylene (PTFE), or PS-DVB on polyvinyl chloride. Suitable membranes are available from Ionics Incorporated (Watertown, Mass.), particularly their AR-204 and AR-708 membranes; Pall RAI, Inc. (Happauge, N.Y.), particularly their R1030 and R4030 membranes; Tokuyama Soda (Tokyo, Japan), particularly their AMH membrane; Asahi Glass America, Inc. (New York, N.Y.), particularly their AAV and AMP membranes; and Tosoh Corporation (Tokyo, Japan), particularly their Tosflex membrane. Preferred membranes include the AR-204, AR-708, R1030, and R4030 membranes. The anion membrane may be about 3 mils to about 20 mils thick.

The cation membrane is selectively permeable to metal cations and may also be permeable to water. For example, the cation membrane may permit about 3.5 moles of water per mole of cations to diffuse through it. The cation membrane may be formed from any material which will permit metal cations and water to diffuse through, while excluding carbonate anions. For example, the cation membrane may be made from perfluorosulfonic acid polymer, which is available from Dow Chemical (Midland, Mich.), or Nafion TM, which is available from E. I. DuPont de Nemours (Wilmington, Del.). The cation membrane may be about 3 mils to about 20 mils thick. Preferably, it will be about 9 mils to about 10 mils thick.

A catalyst capable of ionizing hydrogen is disposed on the outer face of the anion membrane to form an anode 10. Catalysts capable of ionizing hydrogen are well known in the art and include platinum, platinum alloys and admixes, and other metals. Similarly, a catalyst capable of ionizing water to hydroxyl ions and hydrogen is disposed on the outer face of the cation membrane to form a cathode 12. Such catalysts are also well known in the art and include platinum, platinum alloys and admixes, and other metals.

The preferred catalyst for both electrodes is platinum black. It may be deposited on the anion and cation membranes by conventional methods to produce a loading of about 1 mg/cm$^2$ to about 10 mg/cm$^2$. Preferably, the catalyst loading will be about 4 mg/cm$^2$ to about 6 mg/cm$^2$ and most preferably about 6 mg/cm$^2$. There is no limit on the amount of membrane surface which the catalyst can cover. A teflon binder may be incorporated with the catalyst according to conventional methods. The catalyst may comprise about 5 weight percent (wt %) to about 30 wt % teflon binder. Preferably, the catalyst will comprise about 15 wt % binder.

An enclosed carbon dioxide collection compartment 14 is located adjacent to the anode. This compartment serves as the feed point for hydrogen, which is fed to the anode, and as a collection point for carbon dioxide. The carbon dioxide collection compartment may be filled with a conductive spacer 16 which supports the anion membrane and allows for passage of electrons to the external circuit. The spacer must be porous to permit hydrogen and carbon dioxide to flow freely through the carbon dioxide collection compartment. It must be constructed from a conductive, chemically inert material which resists hydrogen embrittlement, and may be in any appropriate configuration, for example, a screen package. Suitable materials include tantalum, gold, platinum, and titanium. Titanium is the preferred material if the cost of the spacer is a consideration. Preferably, the spacer will be plated with platinum to improve conductivity and to reduce contact resistance. An endplate 18 defines the outer wall of the carbon dioxide collection compartment. The endplate may be made from any material which can contain the pressures generated in the compartment. For example, the endplate may be made from stainless steel or other chemically inert structural materials.

The carbon dioxide collection compartment is provided with means for supplying hydrogen to any portion of the anode accessible from the collection compartment and means for withdrawing carbon dioxide. These means may be simple arrangements like tubes 20, 22 which penetrate endplate 18. In addition, means should be provided for regulating carbon dioxide pressure in the collection compartment. The pressure may be regulated by controlling the rate at which carbon dioxide is removed from the collection compartment. For example, the pressure regulator means may be a back pressure regulator 24, as shown, or a pressure control valve and pressure controller.

An enclosed scrubbing fluid collection compartment 28 is located adjacent to the cathode. This compartment serves as the feed point for water, which is fed to the cathode, and as a collection point for the regenerated metal hydroxide scrubbing fluid. The scrubbing fluid collection compartment may be filled with a conductive spacer 20 which supports the cation membrane and provides electrons to the electrochemical reaction. The spacer must be porous to permit water and regenerated metal hydroxide scrubbing fluid to flow freely through the scrubbing fluid collection compartment. It must be constructed from a conductive, chemically inert material and may be in any appropriate configuration, for example, a screen package. Suitable materials include tantalum, gold, platinum, or titanium. Titanium is the preferred material if the cost of the spacer is a consideration. Preferably, the spacer will be plated with platinum to improve conductivity and to reduce contact resistance. An endplate 32 defines the outer wall of the scrubbing fluid collection compartment. The endplate may be made from any material compatible with the metal hydroxide scrubbing fluid. For example, the endplate may be made from stainless steel or any other chemically inert structural material.

The scrubbing fluid collection compartment is provided with means for supplying water to any portion of the cathode accessible from the collection compartment and means for withdrawing regenerated metal hydroxide scrubbing fluid. These means may be simple arrangements like tubes 34, 36 which penetrate endplate 32.

Figure 3:
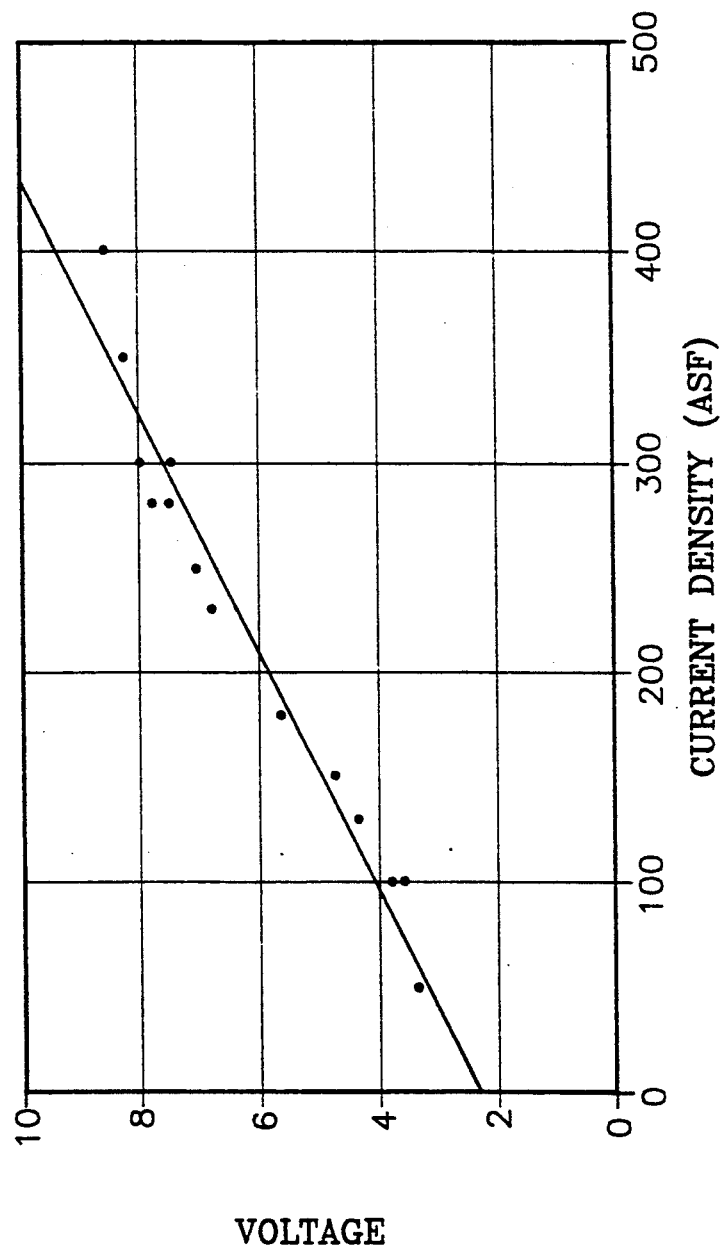
FIG. 3 shows the relationship between the voltage and current density required to operate a typical separator/compressor of the present invention.

The means for inducing an electrical potential across the anode and cathode may be a direct current power source 38 which provides the driving force for the separation or may simply be electrical connections which can be attached to such a source. The power source may be any conventional direct current power source such as a battery or a power supply. It should be capable of producing a potential of about 1.5 volts to about 10 volts. Ideally, the voltage will be kept as low as possible to minimize the power requirements. Typically, the current densities employed in the separator/compressor range from about 25 amperes per square foot (asf) to about 300 asf. The current density is a function of the voltage required to run the separation, which in turn is a function of the concentration of the salt solution fed to the device. Dilute salt solutions require higher voltages because they produce less of a concentration gradient across the membranes. Therefore, there is a lower driving force for diffusion across the membranes. A typical voltage/current relationship is shown in FIG. 3. FIG. 3 is based on a separator/compressor using a Nafion TM 117 membrane (available from DuPont) as the cation membrane and a R4030 membrane (available from Pall RAI) as the anion membrane.

To initiate the separation, a carbonate salt solution, such as potassium carbonate, lithium carbonate, sodium carbonate, or cesium carbonate, is fed to the fluid feed compartment. Potassium carbonate will serve as an example. Ideally, the carbonate salt solution should be saturated to minimize the voltage needed to run the separation. Hydrogen is supplied to the anode, and water is supplied to the cathode. A potential is applied across the electrodes. Hydrogen is ionized at the anode according to the following reaction:

$$H_2 \rightarrow 2H^+ + 2e^- \tag{1}$$

while water is ionized at the cathode according to the following reaction:

$$2H_2O + 2e^- \rightarrow 2OH^- + H_2 \tag{2}$$

Meanwhile, carbonate and potassium ions migrate across the anion and cation membranes, respectively, due to the voltage driving force across the membranes. The concentration gradients are maintained by continuously reacting the carbonate and potassium ions at the anode and cathode, respectively, and removing the reaction by-products.

At the anode, carbonate ions undergo the following reaction to produce carbon dioxide:

$$CO_3^{-2} + 2H^+ \rightarrow CO_2 + H_2O \tag{3}$$

At the cathode, potassium ions combine with hydroxyl ions to produce potassium hydroxide:

$$K^+ + OH^- \rightarrow KOH \tag{4}$$

These reactions primarily occur at the catalyst/fluid interface, although there is some indication that some reaction also occurs on the surfaces of the conductive spacers located in the carbon dioxide collection compartment and scrubbing fluid collection compartment. Water and any potassium carbonate which is not removed from the feed flow through the feed compartment and leave the device. Potassium hydroxide, which is the regenerated scrubbing fluid, water, and hydrogen are removed from the scrubbing fluid collection compartment.

The carbon dioxide produced at the anode is collected in the carbon dioxide collection compartment and is released by a pressure regulator means to supply carbon dioxide at a desired pressure. Carbon dioxide may be supplied at pressures of up to about 1000 psi above the pressure in the fluid feed compartment. Pressures in the fluid feed compartment can range from atmospheric pressure up to about 1000 psig. Preferably the pressures in the fluid feed compartment will be between atmospheric pressure and about 800 psig. The maximum pressure at which carbon dioxide can be supplied from any given device depends on the materials used to construct the membranes and endplates. Ordinarily, the membranes are the components which determine the maximum operating pressure because they rupture under too high a differential pressure.

Figure 2:
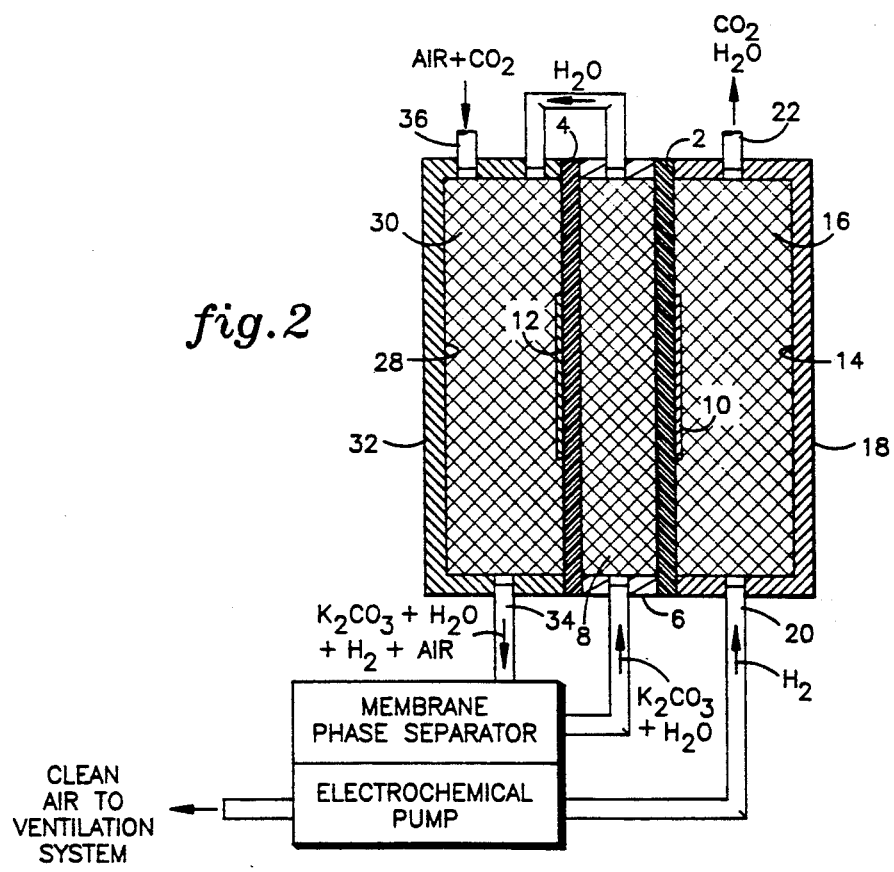
FIG. 2 depicts a separator/compressor which incorporates means for contacting a gas containing carbon dioxide with the regenerated scrubbing fluid.

The separator/compressor may also include means for contacting the regenerated metal hydroxide scrubbing fluid with a gas containing carbon dioxide to incorporate the scrubbing operation within the device. The means may be either external or internal to the scrubbing fluid collection compartment. FIG. 2 shows a separator/compressor with means for contacting a gas containing carbon dioxide with the regenerated scrubbing fluid internal to the scrubbing fluid collection compartment. The device is similar to the separator/compressor shown in FIG. 1 except that a gas, such as air, containing carbon dioxide is fed to the scrubbing fluid collection compartment 28 where the carbon dioxide combines with a metal hydroxide to form a metal carbonate. The metal carbonate, water, hydrogen from the water ionization reaction, and air enter a phase separator which separates the gases, air and hydrogen, from the liquid, a water and metal carbonate stream. The phase separator may be any device capable of making this separation, including a conventional membrane separator of the type well known in the art. The water and metal hydroxide stream flows to the fluid feed compartment 6, while the air and hydrogen may enter a pumping means. The pumping means should be capable of separating the hydrogen from the air and moving them to their downstream destinations. For example, the pumping means may be an electrochemical hydrogen pump or some other conventional device. The air may then be fed to a ventilation system or some other downstream device and the hydrogen may be fed to the carbon dioxide collection compartment 14. The rest of the device and its operation are identical to the separator/compressor described above.

EXAMPLES

A separator/compressor unit was fabricated from laboratory hardware to have a circular active area of 0.05 ft$^2$. The cation exchange membrane was a Nafion TM 120 membrane, available from E. I. DuPont de Nemours (Wilmington, Del.), and the anion exchange membrane was a R4030 membrane, available from Pall RAI, Inc. (Happauge, N.Y.). The cathode and anode were both formed from a platinum black catalyst deposited to a loading of 6 mg/cm$^2$. Both catalysts were blended with 15 wt % teflon as a binder. The two membranes were separated by a feed compartment which contained a multilayered screen package fabricated from titanium. Similar screen packages were disposed in the carbon dioxide collection compartment and the scrubbing fluid collection compartment. All of the screens had an electroplated layer of platinum to enhance conductivity.

(1)

A saturated solution of lithium carbonate was circulated through the feed compartment of the separator/compressor at 200 cc/minute (cc/min) and atmospheric pressure. The unit was maintained at a constant temperature of 100° F. Water was passed across the cathode at a rate of 200 cc/min. Hydrogen was supplied to the anode from a standard 1A cylinder. The current density was varied from 0 asf to 400 asf and the resultant voltage was monitored. Carbon dioxide was collected in the carbon dioxide collection compartment at pressures ranging from 5 psig to 30 psig. The pH of the fluid in the scrubbing fluid collection compartment was found to be between 12 and 13.

(2)

A saturated solution of potassium carbonate was circulated through the feed compartment of the separator/compressor at 200 cc/min and atmospheric pressure. The unit was maintained at a constant temperature of 100° F. Water was passed across the cathode at a rate of 200 cc/min. Hydrogen was supplied to the anode from a standard 1A cylinder. The current density was varied from 0 asf to 400 asf and the resultant voltage was monitored. Carbon dioxide was collected in the carbon dioxide collection compartment at pressures ranging from 5 psig to 30 psig. The pH of the fluid in the scrubbing fluid collection compartment was found to be between 12 and 13.

The separator/compressor of the present invention combines two desirable operations in a single device. Not only does the separator/compressor regenerate a metal hydroxide scrubbing fluid from a carbonate salt solution, it also compresses carbon dioxide to make it readily available for downstream processing. By compressing carbon dioxide within the device, there is no need for an auxiliary carbon dioxide compressor. Therefore, the separator/compressor can save space and weight in space-limited environments such as spacecraft and undersea vehicles.

The integral carbon dioxide compression feature can be incorporated in the separator/compressor disclosed herein because of the use of semi-permeable membranes as solid polymer electrolytes. These membranes permit the construction of a carbon dioxide collection compartment in which carbon dioxide can be collected and compressed which is separated from the liquid feed stream. Removing carbon dioxide from this compartment at a controlled rate permits the carbon dioxide to be raised to a pressure compatible with downstream processing. This is not possible in the prior art devices which made use of liquid electrolytes and evolved carbon dioxide directly from a liquid solution.

It should be understood that the invention is not limited to the particular embodiment shown and described herein, but that various changes and modifications may be made without departing from the spirit and scope of the claimed invention.

I claim:

1. A device for separating and compressing carbon dioxide from a carbonate salt, comprising:
   (a) a solid polymer electrolyte anion membrane having an inner face and an outer face;
   (b) a solid polymer electrolyte cation membrane having an inner face and an outer face;
   (c) a fluid feed compartment bounded by the inner faces of the anion and cation membranes, wherein the fluid feed compartment is capable of containing a liquid carbonate salt solution;
   (d) a catalyst capable of ionizing hydrogen disposed on the outer face of the anion membrane to form an anode;
   (e) a catalyst capable of ionizing water to hydroxyl ions disposed on the outer face of the cation membrane to form a cathode;
   (f) an enclosed carbon dioxide collection compartment adjacent to the anode and the outer face of the solid polymer electrolyte anion membrane, wherein the solid polymer electrolyte anion membrane separates the carbon dioxide collection compartment from liquid in the fluid feed compartment to permit the carbon dioxide collection compartment to produce carbon dioxide at a pressure higher than the pressure in the fluid feed compartment;

(g) means for regulating carbon dioxide pressure in the carbon dioxide collection compartment;

(h) means for supplying hydrogen to the anode through the carbon dioxide collection compartment;

(i) an enclosed metal hydroxide scrubbing fluid collection compartment adjacent to the cathode and the outer face of the solid polymer electrolyte cation membrane;

(j) means for supplying water to the cathode through the metal hydroxide scrubbing fluid collection compartment;

(k) means for withdrawing regenerated metal hydroxide scrubbing fluid from the metal hydroxide scrubbing fluid collection compartment; and (l) means for inducing an electrical potential across the anode and cathode;

wherein the device is capable of separating the carbonate salt fed to the fluid feed compartment into compressed carbon dioxide that is collected in the carbon dioxide collection compartment and regenerated metal hydroxide scrubbing fluid that is collected in the metal hydroxide scrubbing fluid collection compartment.

2. The device of claim 1 further comprising a spacer fabricated from a material selected from the group consisting of niobium, tantalum, titanium, zirconium, polytetrafluoroethylene and ceramics disposed in the fluid feed compartment and electrically conductive spacers fabricated from a material selected from the group consisting of tantalum, gold, platinum, and titanium disposed in the carbon dioxide collection compartment and scrubbing fluid collection compartment.

3. The device of claim 1 wherein the anion membrane is about 3 mils to about 20 mils thick.

4. The device of claim 1 wherein the cation membrane is about 3 mils to about 20 mils thick.

5. The device of claim 1 wherein the anode catalyst is platinum black deposited to a loading of about 1 $mg/cm^2$ to about 10 $mg/cm^2$.

6. The device of claim 1 wherein the cathode catalyst is platinum black deposited to a loading of about 1 $mg/cm^2$ to about 10 $mg/cm^2$.

7. The device of claim 1 further comprising means for contacting a gas containing carbon dioxide with the regenerated metal hydroxide scrubbing fluid.

8. The device of claim 7 further comprising a phase separator downstream of the means for contacting a gas containing carbon dioxide with regenerated metal hydroxide scrubbing fluid, wherein the phase separator is capable of separating water and metal carbonate from air and hydrogen exiting the means for contacting carbon dioxide with regenerated metal hydroxide scrubbing fluid, and means for pumping the air and hydrogen to downstream destinations.

* * * * *